United States Patent
Levionnais et al.

(10) Patent No.: US 10,833,777 B2
(45) Date of Patent: Nov. 10, 2020

(54) METHOD OF PERSONALIZING A SECURE TRANSACTION DURING A RADIO COMMUNICATION

(71) Applicant: ORANGE, Paris (FR)

(72) Inventors: Philippe Levionnais, Chatillon (FR); Clement Duval, Chatillon (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/468,971

(22) PCT Filed: Dec. 8, 2017

(86) PCT No.: PCT/FR2017/053458
§ 371 (c)(1),
(2) Date: Jun. 12, 2019

(87) PCT Pub. No.: WO2018/109330
PCT Pub. Date: Jun. 21, 2018

(65) Prior Publication Data
US 2019/0372679 A1    Dec. 5, 2019

(30) Foreign Application Priority Data
Dec. 12, 2016 (FR) .................................. 16 62320

(51) Int. Cl.
*H04B 5/00* (2006.01)
*H04B 13/00* (2006.01)
(Continued)

(52) U.S. Cl.
CPC ....... *H04B 13/005* (2013.01); *G06Q 20/3278* (2013.01); *H04W 4/20* (2013.01); *H04W 12/003* (2019.01)

(58) Field of Classification Search
USPC ...................................................... 455/41.1
See application file for complete search history.

(56) References Cited

U.S. PATENT DOCUMENTS

| 2009/0233548 | A1* | 9/2009 | Andersson | H04B 13/005 455/41.2 |
| 2015/0242863 | A1* | 8/2015 | Sato | G07G 1/0036 705/7.29 |

(Continued)

FOREIGN PATENT DOCUMENTS

| WO | 2006120582 A1 | 11/2006 |
| WO | 2012131224 A1 | 10/2012 |
| WO | 2015083126 A1 | 6/2015 |

OTHER PUBLICATIONS

English translation of the Written Opinion of the International Searching Authority dated Jun. 18, 2019 for corresponding International Application No. PCT/FR2017/053458, filed Dec. 8, 2017.

(Continued)

*Primary Examiner* — Kathy W Wang-Hurst
*Assistant Examiner* — Max Mathew
(74) *Attorney, Agent, or Firm* — David D. Brush; Westman, Champlin & Koehler, P.A.

(57) ABSTRACT

A method of making available personalization data in respect of a service between a terminal and a device. The terminal is able to communicate with the device on a first near-field channel and on a second wireless channel distinct from the first channel. The method includes, on the terminal, the steps of: obtaining a first message on the first channel, comprising at least one random datum; transmission on the second channel of a second message in response to the first message; establishment of a communication session on the second channel with the device; calculation of a secret datum as a function of the random datum received; transmission of the secret datum on the second channel; reception of a request for a personalization datum; transmission of at least one personalization datum in response to the request.

16 Claims, 2 Drawing Sheets

(51) Int. Cl.
 *H04W 12/00* (2009.01)
 *G06Q 20/32* (2012.01)
 *H04W 4/20* (2018.01)

(56) References Cited

U.S. PATENT DOCUMENTS

| | | | |
|---|---|---|---|
| 2016/0172578 A1* | 6/2016 | Valbin | H01L 41/047 600/508 |
| 2016/0227446 A1* | 8/2016 | Rodzevski | H04B 13/005 |
| 2018/0351604 A1* | 12/2018 | Levionnais | H04B 5/0068 |
| 2019/0385171 A1* | 12/2019 | Cheng | G06Q 20/3278 |
| 2019/0386796 A1* | 12/2019 | Melodia | H04B 13/005 |

OTHER PUBLICATIONS

International Search Report dated Jan. 19, 2018 for corresponding International Application No. PCT/FR2017/053458, filed Dec. 8, 2017.
English translation of the Written Opinion of the International Searching Authority dated Jan. 19, 2018 for corresponding International Application No. PCT/FR2017/053458, filed Dec. 8, 2017.

* cited by examiner

METHOD OF PERSONALIZING A SECURE TRANSACTION DURING A RADIO COMMUNICATION

CROSS-REFERENCE TO RELATED APPLICATIONS

This Application is a Section 371 National Stage Application of International Application No. PCT/FR2017/053458, filed Dec. 8, 2017, the content of which is incorporated herein by reference in its entirety, and published as WO 2018/109330 on Jun. 21, 2018, not in English.

FIELD OF THE DISCLOSURE

The invention relates to the communications that are initiated over a short-range wireless channel. More specifically, the invention relates to a method for implementing secure and personalized services between a portable terminal and a device that are capable of initiating a communication using the capacity for conductivity of the human body to transmit the electromagnetic waves carrying said wireless communications.

BACKGROUND OF THE DISCLOSURE

New wireless communication techniques using the human body as a channel have recently emerged. In these technologies, that are grouped together under the generic term IBS (Intra-Body Communication) or even BCC (for Body Channel Communication), the human body acts as a conductor to transmit information from one point to another. They are grouped together in two broad categories, the first using a coupling by induction (capacitive coupling), in which the induced electromagnetic signal is coupled through the air or the ground, and the second using a so-called galvanic coupling, for which an alternating current is injected into the human body considered as a waveguide.

The interest here is focused on the first type of methods based on a coupling by induction, also often called "near-field methods" or NF (Near-Field) methods, suitable for proximity communication, which do not necessarily require physical contact with the device. "Proximity" is understood to mean a distance of the order of a few millimeters. Near-field communications are usually known by the acronym "NFC" (for "Near-Field Communication"), based primarily on the ISO (International Standard Organization) standard 14443, and use wireless technologies to allow an exchange of information between two peripheral devices separated by a short distance.

Systems are known from the state of the art that allow for messages to be exchanged by using the capacity for conductivity of the human body to transmit the electromagnetic waves carrying wireless communications.

The international patent application published under the number WO2012/131224 describes in particular a communication system comprising a portable transmitter device whose antenna is in contact with, or very close to, the user, here called the "holder". The signal is modulated by means of a low-frequency modulator and transmitted through the body of the user. It is in fact known that the human body exhibits capacities for conduction that are suitable for conveying such electromagnetic signals provided that the antenna is situated in proximity (that is understood to mean at least a few centimeters, but not necessarily in contact) to the body of the user and designed to provide the expected objective. This system according to the state of the art also comprises a receiver which comprises a surface composed of an antenna of the same type as that of the transmitter and which can be approached by the hand of the user. The receiver device receives the signal by virtue of the entry into physical proximity of the user with the antenna (likewise, that is understood to mean: at least a few centimeters, but not necessarily in contact). The received signal is demodulated and transmitted to the equipment designed to perform processing operations, in this particular case to implement the transaction (payment, opening of a door, etc.). These systems offer the advantage for the user of being able to keep the terminal in a pocket throughout the duration of the processing, therefore to have the hands free, without fear of having the terminal stolen or of dropping the terminal, or of wasting time by searching for it in a bag, etc.

However, such an architecture offers a very limited communication channel: it is currently impossible to pass messages of large size (for example files, images, etc.) through the human body. In addition, this type of solution requires the holder to remain in physical proximity to the receiver device, which can be restrictive. Finally, this type of communication is not secure, thereby prohibiting services involving personal data of the user (for example, bank data).

The invention offers a solution that does not present the drawbacks of the state of the art.

SUMMARY

To this end, according to a functional aspect, the invention relates to a method for making available personalization data with respect to a service between a terminal and a device, the terminal (1) being able to communicate with the device (3):
  over a first channel in near-field mode, and
  over a second wireless channel distinct from the first channel the method comprising, on the terminal, the steps of:
  A. obtaining of a first message over the first channel, said message comprising at least one random datum;
  B. transmission, over the second channel, of a second message in response to the first message;
  C. establishing of a communication session over the second channel with the device;
  D. computation of a secret datum as a function of the random datum received;
  E. transmission of the secret datum over the second channel;
  F. reception of a request for a personalization datum over the second channel;
  G. transmission of at least one personalization datum in response to the request.

"First channel" is understood to mean a communication channel based on a near-field communication. The first channel is established for example between the terminal and the master device, which typically takes the form of a fixed terminal of NFC or IBC type as defined above.

"Second channel" is understood to mean a wireless communication channel which is distinct from the first channel. Any radio technology can be used in this context.

"Personalization datum" is understood to mean a characteristic datum of the terminal and/or of its user (for example the identity, rights, weight, size, preferences, etc. of the user), on the basis of which a server will be able to be personalized, that is to say adapted to the user.

The method according to the invention makes it possible to initiate the communication over a first channel (for example of NFC or IBC type) between a terminal of the user (its holder), and a master device such as a fixed terminal of NFC or IBC type, by a simple gesture of the user who enters his or her hand (or any other part of his or her body) into immediate proximity to the device and therefore allows his or her terminal to communicate over the first channel.

"Immediate proximity" is understood to mean a distance that is sufficiently small for the communication to be established over the first channel (for example less than a few cm).

Once the communication is initiated, it is advantageously continued over a second radio channel, of different nature (Bluetooth, Wi-Fi, Zigbee, etc.). Subsequently, the verification data and the personalization data necessary for the establishing of the service are exchanged over this second channel.

Advantageously according to this method, the communication established between the master device and the terminal is secure, while allowing the user of the terminal to keep it in his or her pocket. In effect, the initialization of the method over the first channel makes it possible to use a near-field technology (NFC or IBC) to receive a random datum which will be used subsequently to secure the transaction between the two entities over the second channel, the first channel being abandoned. This method makes it possible at the same time:

- to authenticate the terminal of the user, since only an authorized (authenticated) terminal, that is to say one that knows the function making it possible to generate the secret code on the basis of the random datum, can benefit from the personalization service;
- to secure the communication over the second channel, because the random datum used for the exchanges over the second channel is received in near-field mode, therefore over a different channel, with a particular frequency that is different from that of the second channel. This random datum is therefore difficult to obtain for a hacker who might be listening on the second channel;
- to ensure a high data rate, since the second channel (of radio type) does not have the possible constraints of the near-field channel.

According to a particular implementation of the method for making available personalization data according to the invention, such a method is characterized in that the first channel uses electromagnetic wave conduction capacities of the body of a user holding the terminal, said terminal being located in immediate proximity to the holder, and in that the first message is received when the holder of the terminal performs a movement to enter into the immediate proximity of the device.

"First channel" is understood here to mean a communication channel of IBC type as described above, based on a near-field communication associated with a transmission of the electromagnetic field via the body of the user. The first channel is established between the terminal, typically situated in the pocket or in the bag of the user, and the master device.

The method according to the invention makes it possible to initiate the communication over a first channel of IBC type between a terminal situated in immediate proximity to the user (its holder), and a master device such as a fixed terminal of IBC type, by a simple gesture of the user who enters into immediate proximity to the device by a deliberate gesture toward the device until only a very short distance away from it. It is recalled that "immediate proximity" is understood to mean a distance that is sufficiently small for the communication to be established over the first channel (for example less than two centimeters); note that the skin of the user does not need to be in contact with the terminal, and, likewise, the hand of the user is not necessarily in physical contact with the device.

Advantageously according to this embodiment, the communication established between the master device and the terminal allows the user of the terminal to keep it in his or her pocket. In effect, the initialization of the method over the first IBC channel makes it possible to use the conductivity of the body of the user to receive a random datum which will be used subsequently to secure and personalize the transaction between the two entities (terminal and device) over the second channel, the first channel being abandoned. This method makes it possible at the same time:

- to secure the physical aspect of the transaction, since at no moment does the user have to take the terminal out of his or her pocket, by virtue of the IBC communication;
- to ensure a high data rate, since the second channel (of radio type) does not have the very low throughput constraints of the IBC channel.

According to a particular implementation of the method for making available personalization data according to the invention, which will be able to be implemented as an alternative to or together with the preceding one, such a method is characterized in that the personalization datum is transmitted over the second channel to said device.

Advantageously according to this embodiment, which will be able to be implemented as an alternative to or together with the preceding ones, it is the master device, which has therefore initiated the communication, which receives the personalization datum enabling it to implement the personalized service for this user. For example, if it concerns a door, it can be opened conditionally on the personalization datum that it has received.

According to another particular implementation of the method for making available personalization data according to the invention, which will be able to be implemented as an alternative to or together with the preceding ones, such a method is characterized in that:

said request for a personalization datum also includes at least one address of at least one second device;
said personalization datum is transmitted to the second device by using said address.

Advantageously according to this embodiment, it is the device other than the master, but whose address is known to the master, which receives the personalization datum enabling it to implement the personalized service for this user. For example, if the master device is situated at the house entry door, the terminal can be requested to respond to one or more connected objects of the home: rolling shutters, connected television, Hi-Fi system, home gateway, etc.

According to another particular implementation of the method for making available personalization data according to the invention, which will be able to be implemented as an alternative to or together with the preceding ones, such a method is characterized in that the step of transmission of a message over the second channel is preceded by a step of opening of the second channel is the latter is closed.

Advantageously according to this implementation, the terminal has not necessarily activated its radio module (e.g. Bluetooth) before approaching the master device. It is thus possible to simplify the management of the method by the user and to produce energy savings on the terminal, by activating the Bluetooth module to open the second channel only when the communication over this channel proves necessary to the continuation of the transaction. This also contributes to the security of the communication over the second channel, which is limited in time but which makes data hacking difficult.

According to another particular implementation of the method for making available personalization data according to the invention, which will be able to be implemented as an alternative to or together with the preceding ones, such a method is characterized in that the first communication channel is closed in transmission on the terminal throughout the duration of the method.

Advantageously according to this implementation, no transmission of data by the terminal is authorized during the steps of the method over the IBC channel. This makes it possible to dispense with the need for an IBC transmission module in the terminal (modulator, etc.) and therefore simplifies its architecture.

According to another particular implementation of the method for making available personalization data according to the invention, which will be able to be implemented as an alternative to or together with the preceding ones, such a method is characterized in that the first message also comprises a service identification datum and:
  the method also comprises a step of testing of the validity of the service identifier;
  the steps B to G are performed only if the service identifier is valid.

Advantageously according to this implementation, the first message broadcast by the master device comprises a service identifier. This identifier immediately allows the terminal to know whether the service proposed by the device concerns it, that is to say whether it has hardware and software means for its implementation. If that is not the case, the method is not implemented, and in particular the Bluetooth channel can remain closed, which saves on the hardware and software resources of the terminal. In addition, this service identifier makes it possible to easily discriminate two terminals which might connect to two distinct devices for two different services, even if the two users of the two terminals are sufficiently close to each of the devices to potentially establish a communication.

Finally, advantageously, if the two terminals use the same service identifier, it will be noted that the presence of the random datum prevents a terminal from connecting by chance to a device which is not the device targeted: in this case, the device chosen in error will not validate the secret datum received and will therefore reject the connection.

According to another functional aspect, the invention relates to a method for personalizing a service between a device and a terminal, the device being able to communicate with a terminal:
  over a first channel in near-field mode, and
  over a second wireless channel having a carrier distinct from the first channel, the method comprising, on the master device, the steps of:
  H. broadcasting of a first message over the first channel, said message comprising at least one random datum;
  I. reception, over the second channel, of a second message in response to the first message broadcast over the first channel;
  J. establishing of a communication session over the second channel with the terminal;
  K. obtaining, over the second channel, of a secret datum;
  L. evaluation of the validity of the secret datum as a function of the random datum;
  M. as a function of the validity of the secret datum, acquisition by the master device of a personalization datum of the terminal over the second channel;
  N. implementation of the personalization service.

This method by analogy offers the same advantages as those mentioned for the method for making available personalization data being executed on the terminal, in particular it makes it possible:
  to authenticate the terminal of the user, since only an authorized (authenticated) terminal, that is to say one that knows the function making it possible to generate the secret code on the basis of the random datum, can benefit from the personalization service;
  to secure the communication over the second channel, because the random datum used for the exchanges over the second channel is received in near-field mode, therefore over a different channel, with a particular frequency that is different from that of the second channel. This random datum is therefore difficult to obtain for a hacker who might be listening on the second channel;
  to ensure a high data rate, since the second channel of radio type does not have the very low throughput constraints of the near-field channel.

According to a particular implementation of the personalization method according to the invention, such a method is also characterized in that:
  the first message comprises a first service identification datum and the second message comprises a second service identification datum;
  the method comprises a step of comparison of the first and second service identifiers;
  the steps J to N are performed only if the first and the second service identifiers are identical.

Advantageously, according to this implementation, the first message broadcast by the master device comprises a service identifier which is returned to it in an acknowledgement message from the terminal. This identifier allows the device to know that the terminal is able to implement the service. If this is not the case, the method is not implemented, and in particular the Bluetooth channel can remain closed in transmission, which saves on the hardware and software resources of the device.

According to another particular implementation of the personalization method according to the invention, which will be able to be implemented as an alternative to or together with the preceding one, such a method is characterized in that, during the steps of broadcasting of a first message over the first channel, and of reception of a second message over the second channel, the second channel is closed in transmission on the device.

Advantageously, this embodiment makes it possible to secure the access to the master device, since only a user knowing its physical location can approach near enough and trigger, by a deliberate approach gesture, the reception of the message (M1) from the master device; in effect, the master device does not transmit any message over the second channel (Bluetooth) until the acknowledgement has been received. It is therefore undetectable on this channel.

According to another particular implementation of the personalization method according to the invention, which will be able to be implemented as an alternative to or together with the preceding ones, such a method is characterized in that the first communication channel is closed in reception on the device throughout the duration of the method.

Advantageously according to this implementation, no reception of data is authorized during the steps of the method over the IBC channel. This makes it possible to dispense with the need for an IBC reception module in the master device (demodulator, etc.) and therefore simplifies its architecture.

According to a hardware aspect, the invention relates also to a terminal for making available personalization data with respect to a service, the terminal being able to communicate with a device via:
- a first communication module for a first channel in near-field mode, and
- a second communication module for a second wireless channel distinct from the first, the terminal further comprising:
- a module for obtaining a first message over the first channel, said message comprising at least one random datum;
- a module for transmitting, over the second channel, a second message in response to the first message;
- a module for establishing a communication session over the second channel with the device;
- a module for computing a secret datum as a function of the random datum received;
- a module for transmitting the secret datum over the second channel;
- a module for receiving a request for a personalization datum over the second channel;
- a module for transmitting at least one personalization datum, in response to the request.

According to another hardware aspect, the invention relates also to a device for personalizing a service, the device being able to communicate with a terminal via:
- a first module over a first channel in near-field mode, and
- a second module over a second wireless channel having a carrier distinct from the first, the device further comprising:
- a module for broadcasting a first message over the first channel, said message comprising at least one random datum;
- a module for receiving, over the second channel, a second message in response to the first message broadcast over the first channel;
- a module for establishing a communication session over the second channel with the terminal;
- a module for obtaining, over the second channel, a secret datum;
- a module for evaluating the validity of the secret datum as a function of the random datum;
- a module for acquisition, by the master device, of a personalization datum of the terminal over the second channel;
- a module for implementing the personalization service.

According to this hardware aspect, the invention relates also to a device for personalizing a service as described, said device being a standard near-field communication device, configured to be able to ensure a communication through the human body.

According to another hardware aspect, the invention relates also to a communication system comprising:
- a second device, called master device, as described previously;
- a first device, called terminal, as described previously, said terminal being designed so as to obtain a first message over the first channel when the holder of the terminal performs a movement to enter into the immediate proximity of the device.

According to another hardware aspect, the invention relates also to a computer program capable of being implemented in a terminal as defined above, the program comprising code instructions which, when the program is run by a processor, perform the steps of the method for making available personalization data.

According to another hardware aspect, the invention relates also to a computer program capable of being implemented in a master device as defined above, the program comprising code instructions which, when the program is run by a processor, perform the steps of the personalization method.

These programs can use any programming language, and be in the form of source code, object code, or intermediate code between source code and object code, such as in a partially compiled form, or any other desirable form.

According to yet another hardware aspect, the invention deals with a storage medium that can be read by a data processor on which is stored a program comprising program code instructions for the execution of the steps of one of the methods defined above.

The information medium can be any entity or device capable of storing the program. For example, the medium can comprise a storage means, such as a ROM, for example a CD ROM or a microelectronic circuit ROM, or even a magnetic storage means, for example a diskette (floppy disk) or a hard disk. Also, the information medium can be a transmissible medium such as an electrical or optical signal, which can be routed via an electrical or optical cable, by radio or by other means. The program according to the invention can in particular be downloaded over a network of Internet type. Alternatively, the information medium can be an integrated circuit in which the program is incorporated, the circuit being adapted to execute or to be used in the execution of the method concerned.

Many details and advantages of the invention will be better understood on reading the description of a particular embodiment with reference to the attached drawings given by way of nonlimiting example and in which.

BRIEF DESCRIPTION OF THE DRAWINGS

DETAILED DESCRIPTION OF ILLUSTRATIVE EMBODIMENTS

Figure 1:
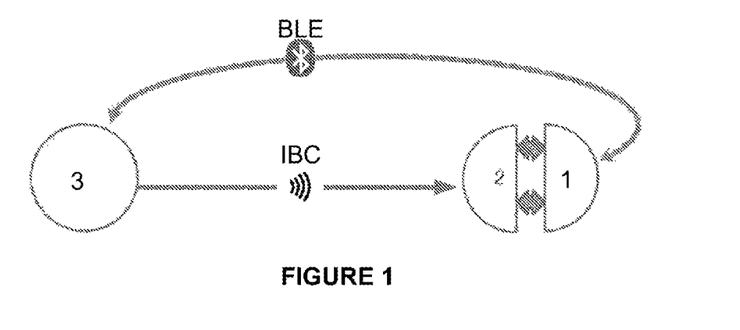
FIG. 1 represents a wireless communication system according to an embodiment of the invention when the user of a terminal invokes a personalization service on behalf of an object, called master device.

FIG. 1 represents a wireless communication system according to an embodiment of the invention when a user (2) holding a portable device (1), hereinafter called terminal, equipped with an IBC module as defined previously, approaches an object (3), called master entity, to implement a personalized transaction; it may be for example a connected object (of the IOT, Internet of things), or a TPE (Electronic Payment Terminal), or a personal computer, etc. A transaction is understood to be any type of service, for example a cash transaction, a ticket confirmation, or even an active personalization in the context, for example, of the use of a vehicle. The user (2) or holder (of the terminal) is for example a human but could alternatively take the form of another living being adapted to transmit radio carrier waves.

The terminal (1) according to the invention is a naturally portable device that can receive radio carrier waves, via an antenna, through the body of the user (2). To this end, the terminal (1) is situated in immediate proximity to the user (2), without necessarily being in direct contact therewith. For example, the terminal (1) is placed in a pocket or a bag carried against the user. In these configurations, it is estimated that the terminal (1) is not more than a few millimeters away from the body of the user (2). The distance is for example less than 2 cm. The terminal (1) is equipped with a battery or cells, for autonomous operation. According to this example, it is a mobile terminal equipped with an IBC antenna (not represented) used to receive the electrical signals modulated in the form of an electromagnetic wave. It will be noted that this antenna is configured in reception but not necessarily in transmission, which limits the risks to the health of the holder. In the context of this exemplary embodiment, the IBC antenna is designed so as to optimally receive the electromagnetic wave through the human body; it is to this end composed of a set of turns of suitable number and disposition. One such antenna is described in the above-mentioned application WO2012/131224. The portable terminal (1) is able, according to this example, to receive electromagnetic waves through the body of the user when the latter is located in immediate proximity to the master device. The terminal also comprises means for communicating over a second channel, for example Bluetooth, with the master device.

The master device (3) is equipment that can transmit radio frequency signals, or carrier waves, through the body of the user, via an IBC antenna (not represented). In this exemplary embodiment, the master device (3) comprises a surface composed by the antenna, possibly protected and adapted to react when the user touches it or enters into proximity with it, for example by bringing his or her hand close to it. The term "surface" is in no way limiting and is given as an illustrative example, the antenna being the only means essential to the operation of the device. The assembly composed of the antenna, of the surface and more generally of all the components necessary for the implementation of an IBC communication is hereinafter called "transmitter IBC module", denoted MIBCe. It will be noted that this module corresponds to the standard NFC module of a fixed terminal of NFC type parameterized for an IBC communication by the loading of a specific program (software), without modification of the hardware. The master device according to this example (3) is a computer comprising, for example, a user interface (9), also called HMI, intended to display messages for the attention of the user and to possibly receive data. The master device also comprises means for communicating over a second channel, for example Bluetooth, with the terminal.

The user (2) is, for example, according to a first scenario hereinafter called "vehicle personalization scenario", the lessor of a vehicle. In this context, the master device is composed of the onboard computer of the vehicle and of an IBC module comprising a surface as described previously, situated for example in the door, in the lock, or even in the steering wheel of the car. Advantageously, if it is located in the handle of the door, the user will necessarily bring his or her hand close to the antenna to open the door and trigger the service. Subsequently, the implementation of the invention makes it possible, once the user has entered into the car, to implement a personalization of the vehicle: adjustment of the seats (according to body parameters such as the size and/or the weight of the user), of the rearview mirrors, of the driving mode (according to preferences regarding, for example, the more or less sporty type of driving of the user), etc. According to another scenario hereinafter called "banking scenario", the user could be in a store and want to pay for a purchase using a bank card electronically rendered on his or her terminal. The master device can, according to this example, be a TPE (Electronic Payment Terminal) equipped with an antenna as described above and able to establish with the mobile terminal a secure communication in order to confirm the monetary transaction; note that the TPEs do not need to be physically modified, only equipped with NFC contactless technology and means of communication over the second channel (Bluetooth). A software change is however necessary to perform the method according to the invention. According to yet another scenario, hereinafter called "home scenario", the user is a member of a family and the transaction will make it possible to personalize the connected objects of the house when he or she goes home: he or she places the hand on an "IBC surface" which is located at the entry of his or her residence. Based on the recognition of the user, a certain number of actions can be triggered in the home: opening of a door, switching on of the lights, of the television, etc. According to yet another example, the master device is a connected object, placed for example on the refrigerator, and the latter performs appropriate actions according to the person who has just approached it (filling, locking, etc.). According to yet another example, called "professional scenario", two users A and B of one and the same PC can personalize the resources, and in particular the display screen of the PC by manipulating the mouse, which comprises the master device: when the user A grasps the mouse, the PC personalizes the environment of A (preference, data, applications, desktop, display, etc.), then automatically the environment of B when B in turn grasps the mouse, the method thus making it possible to switch very naturally from one user to the other.

It will be noted that the terminal (1) can potentially perform direct NFC transactions if it is approached by the master device but that it is more advantageous to use IBC transactions via the body of the user since this avoids the need for him or her to take the terminal out of his or her pocket, his or her bag, etc., which offers both great freedom of movement and advantageous security (against the theft, the dropping, etc. of the terminal), as well as a simplification of the uses since the holder is not even aware, in some cases, for example in the vehicle personalization scenario, that the communication has been initialized. The personalization of the vehicle is done in a way unwittingly, as soon as he or she places the hand on the handle of the door.

The terminal (1) and the master device (3) also conventionally have radio modules which allow them to communicate according to a known wireless communication protocol, Bluetooth, Wi-Fi or Zigbee for example. It should be recalled that Bluetooth is a short-range network technology that makes it possible to link devices together wirelessly. Bluetooth makes it possible to transmit data or voice between equipments equipped with radio modules, over a radius of from the order of ten or so meters to a little less than a hundred or so meters and with low electrical consumption. The Bluetooth used in this exemplary embodiment is preferably of Bluetooth Low Energy, or BLE, type, characterized by very low consumption and an operating distance of the order of a meter (3 or 4 at the maximum), which is sufficient for the type of transactions targeted. For its part, the term Wi-Fi covers all of the standards of the IEEE 802.11 specification for wireless communications that can range up to a few hundred meters. The term Zigbee denotes a set of high-level communication protocols using low-consumption radio transmissions, based on the IEEE 802.15.4 standard.

In the context of particular interest here, the method according to this embodiment of the invention proceeds in three stages, or phases, which are transparent to the user of the terminal:

In a first stage, which corresponds to a phase called "IBC phase", the user approaches the reader (3) and directs his or her hand above the surface including the antenna; according to the examples of personalized services mentioned above, the IBC module comprising the antenna and the surface of the master device are located in the handle of the car that the user has just leased (the vehicle personalization scenario), in a store (banking scenario), in a connected object of the house (domestic scenario), in the computer mouse (professional scenario), and the terminal (1) of the user is in his or her pocket. The IBC application installed on the master device (1) transmits an initial message (M1) comprising a random datum and, according to this embodiment, a unique identifier of the service; the random datum is generated by the master device for the subsequent establishing of a secure communication; the service identifier makes it possible to immediately target a service which is available both on the master device and on the terminal (for example: banking service, vehicle personalization service, etc.). The modulated signal carrying the message (M1) is conveyed by the body of the user to his or her terminal (which is for example located in his or her pocket), demodulated, decoded and analyzed.

In a second stage, which corresponds to a phase called "BLE phase", the terminal (1), if the identification of the message received previously is correct, that is to say if the service identifier corresponds to a service authorized by the mobile, initiates the transaction. To do this, it proceeds with a pairing with the master device; it opens its radio channel (BLE), which here serves as second channel, and transmits a radio message over this channel using its radio transmission module. This communication channel is distinct from that used for the first exchange. A pairing follows over the radio channel between the two devices.

From this moment, a communication session is opened between the two paired devices, but the terminal is not authenticated, that is to say that another terminal could connect to the master device. In order to proceed with the authentication of the terminal, the master device requests a secret datum which can be declared valid only if the two devices have the same function for computing the secret datum from the random datum received by the terminal during the first phase over the IBC channel. After the validity of this secret datum has been verified, the two devices can exchange all the data necessary for establishing, continuing and concluding the transaction (delivery of cash, of a ticket, personalization of a vehicle, of the working environment, etc.). It will be noted that, during this second phase of pairing and of authentication between the terminal and the master device, the user has been able to remove his or her hand from the reader and to move to enter, for example, into the car or into his or her home. This movement is optional but natural inasmuch as it is not very agreeable to remain in immediate proximity with the antenna of the device if this is not necessary.

In a third stage, which corresponds to a phase called "PERSO phase", the terminal (1) transmits to the master device one or more personalization data. In the context of interest here, these data can comprise, for example, the name of the user, which will be able to be used to personalize the environment of the house (domestic scenario); the physical characteristics of the user (weight, size, etc.) if in the context of the vehicle personalization service; his or her banking references in the context of a monetary operation; his or her login/password if in the context of the professional scenario; etc. The master device can then implement the appropriate personalization action corresponding to the personalization data, for example according to the preceding scenarios: opening of a door; switching on of a favorite channel on the television or the Hi-Fi system, control of filling of the refrigerator, etc.; adjustment of the seats and of the rearview mirrors of the vehicle; confirmation of the banking transaction; display of the environment of the user on the screen of the PC; etc.

Thus, the initial phase of sending of the random number is performed via the IBC technology over the first channel in near-field mode, then the other operations (pairing, authentication and subsequent communication leading to the personalization of the service) are performed over the second channel in Bluetooth mode, in a perfectly standard manner. This is particularly advantageous for all the reasons cited above (freedom of movement, security, personalization with authentication, simplification of uses, etc.). To sum up, the second channel makes it possible to benefit from a higher throughput than that offered by a standard IBC communication, and offers an additional securing of the exchanges.

This exemplary embodiment has been given in a purely illustrative and nonlimiting manner.

Alternatively, any other communication of "wireless" type could be used (wireless link of DECT type, etc.), even a wired link, provided that the second channel used does not use the properties of conduction of the body of the user and does not therefore require remaining in immediate proximity to the reader during the second and third phases.

A terminal device (1) according to the invention will now be described in relation to FIG. 2. The terminal (1) is for example a mobile terminal of smartphone type suitable for implementing the invention. According to another example, the terminal is a simple electronic card equipped with the following modules:

a processing unit, or "CPU" (for "Central Processing Unit"), intended to load instructions into memory, to execute them and to perform operations;

a set M of memories, including a volatile memory, or "RAM" (for "Random Access Memory") used to execute code instructions, store variables, etc., and a non-volatile memory of "ROM" (for "Read Only Memory"), or "EEPROM" (for "Electronically-Erasable Programmable Read Only Memory") type, intended to contain permanent information, in particular the personalization data of the user.

a module called "receiver IBC module", MIBCr, including:

an IBC antenna (ANT) suitable for receiving signals over the radio channel and via the human body, so that a modulated electrical signal conveyed by the body of the user will be able to be received by the antenna, which is located in the terminal, in proximity with the human body;

a demodulator (DEMOD), intended to receive a modulated electrical signal via the antenna and to transform it into a digital signal intended to be transmitted to the processing unit. The demodulator is arranged to implement the demodulation steps of the communication method described hereinbelow;

it will be noted that the presence of a modulator (intended to adapt, if necessary, a digital signal produced by the CPU into a modulated electrical signal, intended to be transmitted via the antenna) is not necessary in the exemplary embodiment here since the terminal does not transmit data in IBC mode, but could be useful in some variant implementations;

the software components (firmware, etc.) necessary for the implementation of the IBC communications.

a Bluetooth module (MBT) (Low Energy—BLE—according to this example), intended to transmit and receive data over a Bluetooth channel established with an external device able to communicate according to this standard, in this case the master device. The MBT module is arranged in particular to implement the step of transmission of an acknowledgement message to the master device (3) as well as the steps of reception/transmission of messages relating to the transaction over the Bluetooth channel, as will be detailed hereinbelow with the support of FIG. 4. The MBT module is linked to the antenna, either directly or via the terminal (smartphone):

in the first case, the Bluetooth module is for example located on a substrate combining all the modules necessary for the IBC operation (antenna, demodulator, microprocessor, etc.). It is linked to the output of the antenna demodulator, possibly via other circuits. It receives the data demodulated and possibly processed by a microprocessor, and is then responsible for establishing the Bluetooth communication channel. Advantageously in this case, all the modules can be grouped together on one and the same physical and/or logical entity (circuit, component, etc.), and supported for example by an electronic card that the user can carry in his or her pocket, without it necessarily being associated with a mobile terminal;

in the second case, the Bluetooth module is located elsewhere in the terminal. The demodulated antenna signals are transmitted to the microprocessor of the terminal which is responsible for establishing the Bluetooth communication with the master device. Advantageously in this case, the Bluetooth module natively present on the terminal (a smartphone for example) can be reused.

An application (APPT) intended to implement the method according to an embodiment of the invention, in particular the acquisition of a random datum via the IBS module, the Bluetooth pairing, the production of a secret datum on the basis of the random datum, the acquisition and the communication of the personalization data over the Bluetooth channel. This application can for example be an Applet whose reference corresponds to the service identifier mentioned previously.

Figure 3:
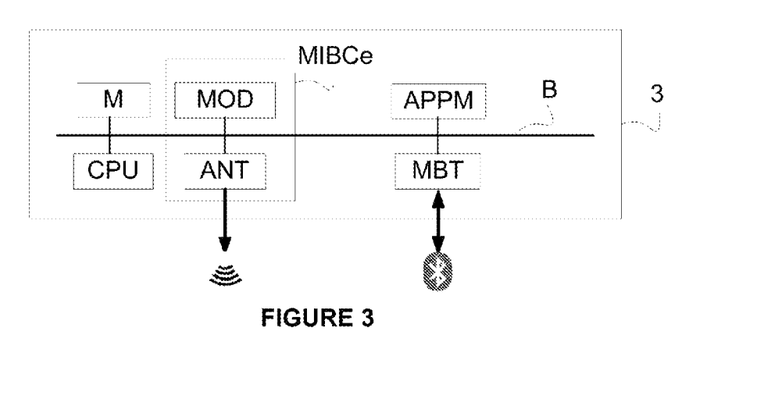
FIG. 3 represents an exemplary embodiment of a master device according to an embodiment of the invention.

A master device (3) according to the invention will now be described in relation to FIG. 3.

Figure 2:
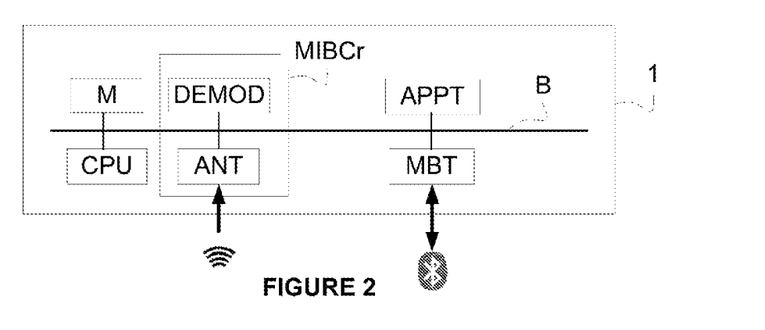
FIG. 2 represents an exemplary embodiment of a terminal according to an embodiment of the invention.

The master device comprises several modules which are similar to those of the terminal 1 described in relation to FIG. 2:

a processing unit or "CPU", intended to load instructions into memory, to execute them, to perform operations.

a set of memories, including a volatile memory or "RAM" (for "Random Access Memory") used to execute code instructions, store variables, etc., and a non-volatile memory, of "ROM" or "EEPROM" type, intended to contain permanent information:

a module called "Transmitter IBC module", MIBCe, including:

an IBC antenna (ANT) suitable for transmitting signals over the radio channel and via the human body, covered by a surface S (not represented);

a modulator (MOD) intended to adapt a digital signal produced by the microprocessor into a modulated electrical signal, intended to be transmitted, via the antenna, through the body of the user. The modulator is arranged to implement the steps of transmission of the initial message (M1) described previously; the modulation operation performed by the modulator is, in this embodiment, an amplitude modulation. Thus, for example, the signal is a signal at 13.56 MHz amplitude modulated with a modulation rate of approximately 10% (known characteristic of the type B according to the NFC standard). The invention is not however limited to this type of modulation. In another exemplary embodiment, the modulation is a frequency modulation, less sensitive to interferences. Note that this embodiment is however more costly because it requires more components. In another exemplary embodiment, a phase modulation can be performed;

the presence of a demodulator is not necessary in the context of this embodiment of the invention;

a receiving surface, not represented, suitable for reacting to the immediate proximity of the user (contact, quasi-contact, light touch, etc.). In the example described here, this IBC surface corresponds to the antenna, so that a modulated electrical signal transmitted via the antenna is able to be conveyed by the body of the user which is in proximity with the surface. In one exemplary embodiment, the antenna can be incorporated in the surface. The surface is arranged so as to cooperate with the processing unit to implement the steps of the method which will be described later;

the software components (firmware, etc.) necessary for the implementation of the IBC communications.

a Bluetooth Low Energy module (MBT) intended to transmit and receive data over a Bluetooth channel established with an external device, in this case the mobile terminal. The MBT module is in particular arranged to implement the steps of reception/transmission of messages relating to the transaction over the Bluetooth channel.

optionally, a user interface (HMI), suitable for transmitting instructions or information messages to the user. For example, the user interface is a screen on which the messages and instructions are displayed. In another exemplary embodiment, the interface is an audio interface that makes it possible to play the messages and instructions. The HMI can also include a keyboard, a microphone, etc.

an application (APPM) intended for the implementation of the method according to an embodiment of the invention, in particular the generation of a random datum, via the IBC module, the Bluetooth pairing, the verification of the secret datum on the basis of the random datum, the requesting and the receiving of the personalization data over the Bluetooth channel, and the implementation of the personalization of the service on the basis of these data. This application corresponds (or relates) to the service identifier mentioned previously, able to communicate with the APPT application on the terminal.

It will be noted that any market-standard reader (for example a TPE) can advantageously be used as master device, provided that it has the benefit of the MBT module and of the MIBCe module, after a simple updating of the software of the reader (installation and/or updating of the APPM application and parameterization of the NFC transmission) to make it able to transmit a message having the IBC characteristics (frequency, modulation, etc.) via its antenna.

Figure 4:
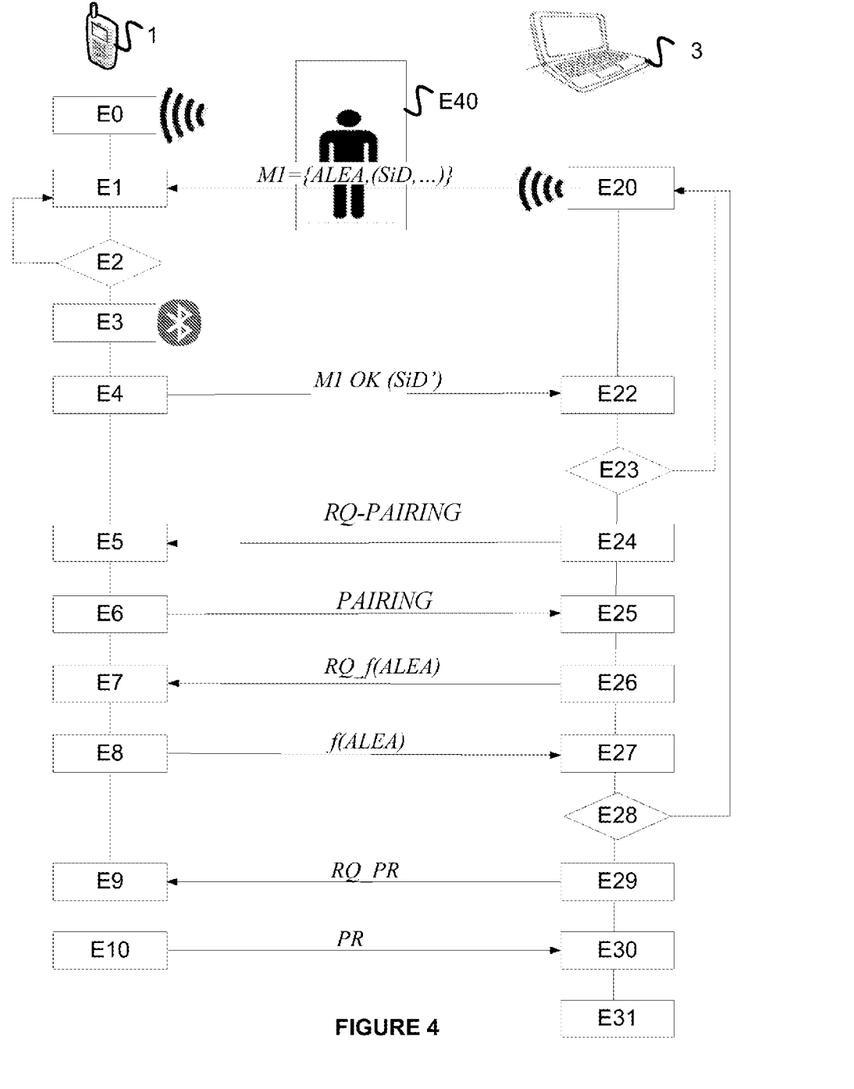
FIG. 4 represents the steps of a method between a terminal and a master device according to an embodiment of the invention.

FIG. 4 represents the steps of a method for secure bidirectional wireless communication between a mobile device (1), also called terminal, carried by a user (2), and a master device (3), both equipped with an IBC module (antenna, surface, modulator/demodulator, firmware, etc.), according to an embodiment of the invention. In addition to their IBC function, the two devices are able to establish another communication channel, preferably radio (Bluetooth, BLE, Wi-Fi, etc.), so as to ensure a correct bit rate, the security of the transaction and the authentication of the user.

In an initial step E20, the master device (3) transmits, via its IBC antenna, an electromagnetic signal coding a message M1 intended for any terminal situated in proximity, for example the terminal (1) carried by the user (2) when he or she approaches the device. The message M1, called first message, or invite message, comprises a plurality of information elements intended to be transmitted continuously during a certain period during which the master device (3) is in transmission mode. For example, the information element consists of a word, "IBC", or else an identifier (SiD) of the service offered (payment, vehicle personalization, or other such service), followed by a random datum (ALEA) which will make it possible to perform an authentication of the transaction after the pairing phase. The master device is also listening in on a second communication channel, according to this particular example a BLE channel. It should be noted that the master device is at this moment undetectable over the second channel because it does not transmit any message over the radio channel, only over the IBC channel.

During an initial step E0, the terminal is set to IBC reception mode (that is to say that it is able to receive a message over the IBC channel).

During the step E40, the user 2 for example brings his or her hand close to the IBC antenna of the master device 3; the message M1 transmitted in a signal modulated during the preceding step is detected and received by the terminal (1). In effect, the user (2), whose hand is in immediate proximity to the IBC antenna of the device, becomes a vector for transmission of the signal transmitted by the master device (3). The terminal (1), in reception state, detects and receives the modulated electromagnetic signal conveyed by the body of the user. The terminal (1) demodulates the signal to obtain a digital signal and extracts therefrom the relevant information (random datum, optionally service identification, etc.)

At the end of this step, the user can move away from the master device and the first channel (IBC) can be closed. This closure is preferably implicit: as soon as the user moves away from the master device, the transmission channel can no longer convey signals and the transmission is broken. This step is optional inasmuch as the user can, if he or she wishes, remain close to the master device, with the hand placed above, but this is of no benefit in the context of this embodiment since the phase of acquisition of the message M1 comprising the random datum is finished. If the channel composed of the body of the user remains open, no further datum will pass through it.

In a next step E2, the terminal (1) optionally checks the service identifier received in the message M1. If the service identifier is correct, that is to say that it does indeed correspond to an application of the terminal, it goes on to the next step. Otherwise, it returns to the preceding step E1 (and the method is stopped as soon as the user moves away from the master device).

In a next step E3, the terminal (1) checks the state of its Bluetooth module; if this module is not active, it opens the Bluetooth channel.

Then it prepares a response for the master device. The digital message associated with the response, or second message (schematically represented in the figure by M1_OK), is broadcast in the step E4 via the antenna of the terminal (1) over a Bluetooth radio channel. It can for example involve BLE data packets comprising a presence message with, if available, the service identification SiD received previously, as well as, optionally, other information which may be relevant: address (MAC) of the terminal, name, conditions of connection to said terminal, etc.

In a detection and reception step E22, the message transmitted during the preceding step E4 by the terminal (1) and transmitted in Bluetooth mode is detected and received by the master device (3).

The response message is tested during a step E23. If the message received is acceptable, that is to say if the form of the acknowledgement is correct and if the other possible information conforms to the expectations of the master device (service number, MAC address, etc.), it can accept the Bluetooth communication with the terminal; during the step E24, it makes a request for pairing with the terminal. Otherwise, the master device (3) can then notify the terminal in this same step that the service cannot be rendered.

In one of these steps, the master device stops transmitting the invite message over the IBC link because it is already in communication with a terminal.

During a step E6, the terminal pairs (connects) with the master device.

The pairing procedure implemented in this embodiment is perfectly conventional and known to the person skilled in the art; as a reminder, a Bluetooth pairing (BLE) takes the following form: the master device sends a random number to the "slave" device (here, the terminal). The slave returns its Bluetooth address (a Bluetooth peripheral device has a unique address, such as the MAC address of the network cards. This address is formed of 48 bits: the first three bytes identify the manufacturer, the next three are those assigned to the peripheral device). From this random number and the Bluetooth address, an encryption key can be computed for the exchange of the messages between the master and the slave. This encryption key makes it possible to avoid man-in-the-middle type hacker attacks.

From this moment, a bidirectional communication link is established between the two entities. It will be noted that this link is secure inasmuch as the protocol used is secure (for example, the BLE standard imposes a certain level of security on the exchanges between two devices that are connected bidirectionally). However, the communication is not authenticated, that is to say that the master device is not yet certain of the identity of the terminal (and therefore of the user) which has just been paired.

To this end, the master device requests, in a step E26, an authentication datum from the terminal. This authentication datum, that is also called secret datum, is, according to this example, a function f known to both entities taking as parameter the variable ALEA (f(ALEA)). Any security function accessible to the person skilled in the art will be able to be used here: identity function, cryptographic functions, combination of functions, etc. This function can, in addition, change over time.

This request is received by the terminal during a step E7.

The terminal, if it is authorized to establish a transaction of this type with the master, that is to say if it knows the function f, computes a result of the function f by using the ALEA as parameter and transmits the result to the master device during a step E8.

The master device receives this information during a step E27 and tests its validity during the next step E28. If the expected information conforms to what is demanded by the master device, that is to say if it has been computed using the correct function f taking the correct random datum as parameter, the master device accepts the communication and goes on to the next step E29. Otherwise, it does not accept the communication, terminates the exchange with the terminal, and the method can restart at the step E20.

It will be noted that the (random datum, identifier) pairing makes it possible to discriminate, in all cases, a terminal 1 conversing with a first device 3 from a terminal 1' conversing with a device 3' close together:

- in the case where the two devices (3 and 3') offer different services (for example a banking service and a transport service), the identifier of the two services is different. The two holders of the terminals 1 and 1' perform a deliberate gesture of approach at the same time, or at least within a time interval that is narrow enough to potentially generate a collision. The devices 3 and 3' however each broadcast their service identifier. According to the method described in this embodiment of the invention, the device 3 registers only the terminal 1 when it acknowledges the banking service and connects to it, whereas the device 3' connects to 1', with no interference between the two methods.
- in the case where the two devices (3 and 3') offer the same type of service (for example a banking service) it is possible to imagine that the service identifier is the same. The two holders of the terminals 1 and 1' perform a deliberate approach gesture at the same time, or at least within a time interval that is narrow enough to potentially generate a collision. The devices 3 and 3' however both broadcast the same service identifier. According to the method described in this embodiment of the invention, if the device 3 connects to the terminal 1 (which has acknowledged the service identifier), the second terminal will not be able to connect to it because the fixed terminal has stopped broadcasting the invite message insofar as it is already connected to a terminal. On the other hand, if the device 3 connects first to the terminal 1', the step of verification of the secret datum allows the device to reject the terminal, which does not correspond to what it expected. The device 3 then notifies the terminal 1' that the payment cannot be performed (step E23). Then, it recommences sending its invite message, and the terminal 1 can connect.

From this step E29, the master device has therefore authenticated the terminal. It can begin the personalization phase by requesting the obtaining of a personalization datum, or, more generally, of a profile (PR) of the terminal (therefore of the user).

This personalization datum is transmitted to it in a step E10. As has been described previously, this datum depends on the application: complete profile of the user of the mobile, preferences, size, weight, dimensions, login, name, age, address, etc. Optionally, this datum can be encrypted according to any mechanism accessible to the person skilled in the art in order to reinforce the security of the communication.

The master device receives this personalization datum in a step E30, then, in a step E31, implements the appropriate personalization action corresponding to the profile (opening of a door, switching on of the television, of the Hi-Fi system; adjusting of the seats and rearview mirror of the vehicle; confirmation of the banking transaction; personalization of the PC, etc.). Then, it can terminate the transaction and optionally close the radio channel.

It goes without saying that the embodiment which has been described above has been given as a purely indicative and nonlimiting example, and that many modifications can easily be made by the person skilled in the art without in any way departing from the scope of the invention.

In particular, it is possible to conceive an authentication of the device by the terminal, which would prevent a dummy device (fixed terminal) from taking the place of the true fixed terminal. In this case, the steps of authentication of the terminal by the fixed terminal (E7, E8, E26, E27) will be followed by similar steps making it possible to authenticate the fixed terminal through a similar mechanism: sending of a second random datum in a second message (M2= {ALEA' . . . }), from the terminal to the fixed terminal, and computation by the fixed terminal of a secret datum (G(ALEA)) by a second function G, identical or not to the first, returned to the terminal. The terminal can then compare the secret datum received to that expected and decide to authenticate or not to authenticate the transmitting fixed terminal.

Although the present disclosure has been described with reference to one or more examples, workers skilled in the art will recognize that changes may be made in form and detail without departing from the scope of the disclosure and/or the appended claims.

The invention claimed is:

1. A method for making available personalization data with respect to a service between a terminal and a device, the terminal being configured to communicate with the device:
    over a first unidirectional channel in near-field mode, and
    over a second bidirectional wireless channel distinct from the first channel,
    the method comprising, on the terminal, the acts of:
    A. obtaining a first message over the first channel, said message comprising at least one random datum and a service identification datum, in response to a user holding the terminal performing a movement to enter into an immediate proximity of the device;
    B. transmission, over the second channel, of a second message in response to the first message;
    C. pairing over the second channel with the device;
    D. authenticating over the second channel with the device, using steps of:
        a. computation of a secret datum as a function of the random datum received on the first channel;
        b. transmission of the secret datum over the second channel;
    E. reception of a request for a personalization datum over the second channel, said personalization datum depending on the service identified by the service identification datum; and F. transmission of the personalization datum in response to the request.

2. The method for making available personalization data as claimed in claim 1, wherein the first channel uses electromagnetic wave conduction capacities of the body of the user holding the terminal, said terminal being located in immediate proximity to the user, and wherein the first message is received when the user of the terminal performs the movement to enter into the immediate proximity of the device.

3. The method for making available personalization data as claimed in claim 1, wherein the personalization datum is transmitted over the second channel to said device.

4. The method for making available personalization data as claimed in claim 1, wherein:
said request for a personalization datum also includes at least one address of at least one second device;
said personalization datum is transmitted to the second device by using said address.

5. The method for making available personalization data as claimed in claim 1, wherein the act of transmission of a message over the second channel is preceded by an act of opening of the second channel if the latter is closed.

6. The method for making available personalization data as claimed in claim 1, wherein the first communication channel is closed in transmission on the terminal throughout the duration of the method.

7. The method for making available personalization data as claimed in claim 1, wherein:
the method also comprises an act of testing of validity of the service identification datum;
the acts B to F are performed only if the service identification datum is valid.

8. A method for personalizing a service between a device and a terminal, the device being configured to communicate with the terminal:
over a first unidirectional channel in near-field (NF) mode, and
over a second bidirectional wireless channel having a carrier distinct from the first channel,
the method comprising, on the device, the acts of:
A. in response to a user holding the terminal performing a movement to enter into an immediate proximity of the device, broadcasting a first message over the first channel, said message comprising at least one random datum and a service identification datum;
B. reception, over the second channel, of a second message in response to the first message broadcast over the first channel;
C. pairing over the second channel with the terminal;
D. authenticating over the second channel with the terminal using steps of:
a. obtaining, over the second channel, a secret datum;
b. evaluation of validity of the secret datum as a function of the random datum;
E. as a function of the validity of the secret datum, acquisition by the device of a personalization datum of the terminal over the second channel, said personalization datum depending on the service identification datum; and
F. implementation of the service.

9. The communication method as claimed in claim 8, wherein:
the first message comprises a first service identification datum and the second message comprises a second service identification datum;
the method further comprises an act of comparison of the first and second service identification datums;
the acts C TO F are performed only if the first and the second service identification datums are identical.

10. The communication method as claimed in claim 8, wherein, during the acts of broadcasting the first message over the first channel, and of reception of the second message over the second channel, the second channel is closed in transmission on the device.

11. The communication method as claimed in claim 8, wherein the first communication channel is closed in reception on the device throughout the duration of the method.

12. A terminal for making available personalization data with respect to a service, the terminal comprising:
a first communication module configured to communicate with a device via a first unidirectional channel in near-field (NF) mode, and
a second communication module configured to communicate with the device via a second bidirectional wireless channel distinct from the first channel,
a processor; and
a non-transitory computer-readable medium comprising instructions stored thereon, which when executed by the processor configure the terminal to perform acts comprising:
obtaining a first message over the first channel, said message comprising at least one random datum and a service identification datum, in response to a user holding the terminal performing a movement to enter into an immediate proximity of the device;
transmitting, over the second channel, a second message in response to the first message;
pairing over the second channel with the device;
authenticating over the second channel with the device, using steps of:
computing a secret datum as a function of the random datum received on the first channel; and
transmitting the secret datum over the second channel;
receiving a request for a personalization datum over the second channel, said personalization datum depending on the service identified by the service identification datum; and
transmitting the personalization datum, in response to the request.

13. A device for personalizing a service, the device comprising:
a first communication module configured to communicate with a terminal over a first unidirectional channel in near-field mode, and
a second communication module configured to communicate with the terminal over a second bidirectional wireless channel having a carrier distinct from the first channel,
a processor; and
a non-transitory computer-readable medium comprising instructions stored thereon, which when executed by the processor configure the terminal to perform acts comprising:
in response to a user holding the terminal performing a movement to enter into an immediate proximity of the device, broadcasting a first message over the first channel, said message comprising at least one random datum and a service identification datum;
receiving, over the second channel, a second message in response to the first message broadcast over the first channel;
pairing over the second channel with the terminal;

authenticating over the second channel with the terminal using steps of:
obtaining, over the second channel, a secret datum; and
evaluating the validity of the secret datum as a function of the random datum;
acquisition, by the device, of a personalization datum of the terminal over the second channel, said personalization datum depending on the service identification datum; and
implementing the service.

14. The device for personalizing a service as claimed in claim 12, said device being a near-field communication device, configured to be able to ensure a communication through the human body.

15. A non-transitory computer-readable medium comprising a computer program stored thereon, the program comprising code instructions which, when the program is run by a processor of a terminal, configure the terminal to perform a method for making available personalization data with respect to a service between the terminal and a device, the terminal being configured to communicate with the device:
over a first unidirectional channel in near-field mode, and:
over a second bidirectional wireless channel distinct from the first channel,
the method comprising, on the terminal, the acts of:
obtaining a first message over the first channel, said message comprising at least one random datum and a service identification datum, in response to a user holding the terminal performing a movement to enter into an immediate proximity of the device;
transmission, over the second channel, of a second message in response to the first message;
pairing over the second channel with the device;
authenticating over the second channel with the device, using steps of:
computation of a secret datum as a function of the random datum received on the first channel; and
transmission of the secret datum over the second channel;
reception of a request for a personalization datum over the second channel, said personalization datum depending on the service identified by the service identification datum; and
transmission of the personalization datum in response to the request.

16. A non-transitory computer-readable medium comprising a computer program stored thereon, the program comprising code instructions which, when the program is run by a processor of a device, configure the device to perform a method for personalizing a service between the device and a terminal, the device being configured to communicate with the terminal:
over a first unidirectional channel in near-field (NF) mode, and
over a second bidirectional wireless channel having a carrier distinct from the first channel,
the method comprising, on the device, the acts of:
in response to a user holding the terminal performing a movement to enter into an immediate proximity of the device, broadcasting a first message over the first channel, said message comprising at least one random datum and a service identification datum;
reception, over the second channel, of a second message in response to the first message broadcast over the first channel;
pairing over the second channel with the terminal;
authenticating over the second channel with the terminal using steps of:
obtaining, over the second channel, a secret datum; and
evaluation of validity of the secret datum as a function of the random datum;
as a function of the validity of the secret datum, acquisition by the device of a personalization datum of the terminal over the second channel, said personalization datum depending on the service identification datum; and
implementation of the service.

\* \* \* \* \*